(No Model.)

T. McFARLAN & H. E. NOTTINGHAM.
DRILLING MACHINE.

No. 315,049. Patented Apr. 7, 1885.

Attest—
F. Sedgwick.
Casper Miles.

Inventors—
Thomas McFarlan
Henry E. Nottingham
By Geo. J. Murray Atty

UNITED STATES PATENT OFFICE.

THOMAS McFARLAN, OF CINCINNATI, OHIO, AND HENRY E. NOTTINGHAM, OF COVINGTON, KENTUCKY.

DRILLING-MACHINE.

SPECIFICATION forming part of Letters Patent No. 315,049, dated April 7, 1885.

Application filed July 26, 1884. (No model.)

*To all whom it may concern:*

Be it known that we, THOMAS MCFARLAN, a citizen of the United States, residing at Cincinnati, county of Hamilton, State of Ohio, and HENRY E. NOTTINGHAM, a citizen of the United States, residing at Covington, county of Kenton, State of Kentucky, have invented certain new and useful Improvements in Drilling-Machines, of which the following is a specification.

Our invention relates, particularly, to the machinist's tool known as the "upright drill." Its objects are a reliable, cheap, and convenient means to counterbalance the drill-spindle and spindle-carrying head, a means by which the feeding mechanism can be instantly thrown in or out of gear, and a means by which the drill-spindle can be rapidly brought down to its work and rapidly returned after the work is completed preparatory to its removal from the table or change of position if more holes than one are to be bored in the same piece.

With these objects in view our invention consists, first, in connecting the counterpoise-weight with the pinion which feeds the drill-spindle, and which has its bearings in the spindle-carrying head; second, in a peculiar friction-clutch, by which the feed mechanism is instantly engaged and disengaged; and, third, in combination with the clutch mechanism, a novel arrangement of devices by which the feed mechanism is thrown out and the spindle rapidly elevated or depressed, as desired, all of which will be fully understood from the following description of the accompanying drawings, in which—

Figure 1:
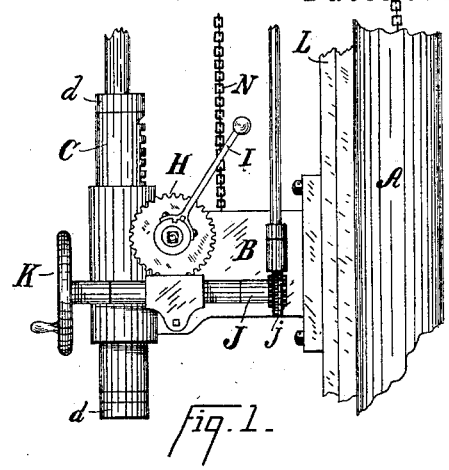
Figure 2:
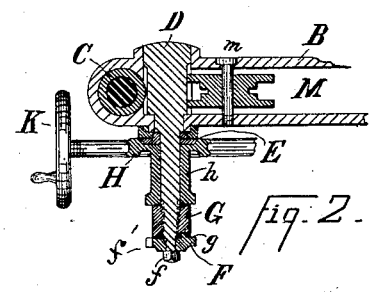
Figure 3:
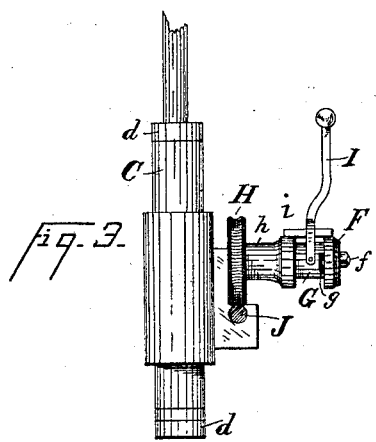

Figure 1 is a side elevation of a part of the upright column of a drill to which our improvements are attached. Fig. 2 is a horizontal transverse section taken through the axis of the feed-spindle, (line $x$ $x$ of Fig. 1.) Fig. 3 is a detail view in front elevation of the spindle-carrying head and its attachments, the hand feed-wheel being removed and its shaft shown in section.

Referring to the parts, which are indicated by similar reference-letters wherever they occur in the various views, A, Fig. 1, is a portion of the column which supports the table and operative mechanism of the drill. This may be of any approved design. It is provided upon the front side with suitable slides and guides, to which the drill-head B is adjustably secured in the usual manner. The spindle-carrier C, which is fitted to slide vertically in the head B, is also constructed, in the usual manner, with a rack upon one side to engage the feed-pinion, which is mounted upon or forms part of the feed-spindle D. The drill-spindle, driven in the usual way, revolves through the carrier C, and has fixed collars $d$ $d$ secured upon it at each end of the carrier C, so that the spindle is carried up and down with the carrier.

Secured permanently upon the spindle D is a friction-clutch, E, and a disk, F, the disk being held in place by a nut, $f$. The outer end of the shaft or spindle D is screw-threaded to receive an internally-screw-threaded sleeve or nut, G. Loosely mounted upon the spindle D, between the nut G and friction-clutch, is a worm-gear, H, provided with a long hub, $h$. The inner face of the gear H has a depression turned in it, which is the counterpart of the adjacent face of the clutch E, the adjacent faces of the gear and disk E forming the opposite members of the friction-clutch. The lever I has its inner end bifurcated to pass upon each side of the nut G, to which it is secured by pins. In the upper portion of the spade-handle end of the lever I is a crossbar, $i$, which, when the clutch is engaged, has its opposite ends resting upon the peripheries of the disk F and the outer flange of hub $h$. The purpose of the lever I is to turn the nut G and force the worm-gear H up against the clutch-disk E, and thus feed the spindle, and also to release the clutch by unscrewing the nut G, and thus release the spindle from the gear H. The other end of the bar $i$ drops into a notch, $f'$, in the periphery of the disk F, when the gear is released from the clutch. The lever is then directly engaged with the spindle or feed-shaft D, and the drill-spindle may be rapidly moved up or down, either to rapidly withdraw the spindle from or to bring it down to its work. When the drill-spindle is being fed to its work, the feeding mechanism is driven by the worm on shaft J engaging the gear H. The shaft J is driven either by the hand-wheel K on its end or by a worm on the vertical shaft L engaging a gear-wheel, *j*, on the inner end of the shaft J. The movement of the nut G on its shaft is limited by a pin which passes from the disk F into a notch, *g*, in the outer end of the nut. It requires but a slight movement to throw the clutch into and out of gear, and the pin striking the end of the slot prevents the clutch from being locked too tight, and insures the bar *i* of lever I dropping into its notch for the quick action of the drill-spindle. The spindle and spindle-carrying head are counterbalanced by a single weight, as will now be described. Within the head-stock B is a cog-wheel, M, which is journaled on a pin, *m*. The teeth of this cog mesh into the pinion on feed-spindle D. Cog M is grooved to receive the chain N, one end of which is secured to it. The chain passes up to the top of the machine over sheaves, down into the hollow column A, and has attached to it the counter-weight. It will be seen that the wheel M is both a gear-wheel and sheave, and that both the spindle and the head carrying it are separately balanced by the weight and chain attached to it.

What we claim as new is—

1. In a feed mechanism for drilling-machines, the combination, substantially as specified, of the spindle-carrier C and feed-spindle D, having a pinion to engage the rack of the spindle-carrier, and a screw-threaded end to receive the nut G, with clutch E, secured upon said spindle, a worm-gear, H, between said nut and clutch, and lever I, secured to said nut to engage and disengage the clutch for the purpose of stopping or starting the feed, as described.

2. The combination, substantially as specified, of the feed-spindle D, having its outer end screw-threaded to receive a nut, G, and a notched collar or disk outside of the nut, with lever I, hinged upon said nut, and having a bar, *i*, to be thrown in or out of engagement with the notch in the disk F, for the purpose of disengaging the feeding mechanism and rapidly moving the drill-spindle by means of the said lever, or of coupling the feed-spindle with feeding gear-wheel.

3. In a drilling-machine such as described, the combination of the spindle-carrier C with driving-spindle D, having its outer end screw-threaded, and having secured upon it the clutch E, and disk or collar F, with the nut G, having the notch *g*, to receive a pin on the collar F, loose gear-wheel H between the nut and disk E, and the lever I, having the cross-bar *i*, said lever being connected to the nut, and bar *i* arranged to be engaged or disengaged from the notch in collar F to couple or uncouple the feeding mechanism, substantially as specified.

4. In an upright drill, the combination, substantially as specified, of the spindle, its movable bearing, and the spindle-carrying head with the grooved cog M, mounted in the head B, and engaging the pinion on the feed-spindle D, and the chain N, secured to said wheel M so as to wind or unwind as the spindle and carrier move up or down, and having a weight at its opposite end to counterpoise the spindle and spindle-carrying head.

THOS. McFARLAN.
HENRY E. NOTTINGHAM.

Witnesses:
  WALTER CHAMBERLIN,
  S. OBERMAYER.